US006785128B1

(12) United States Patent
Yun

(10) Patent No.: US 6,785,128 B1
(45) Date of Patent: Aug. 31, 2004

(54) PORTABLE COMPUTER HAVING COVER SUPPORT MEANS

(75) Inventor: Jae-Sam Yun, Kyunggi-do (KR)

(73) Assignee: Samsung Electronics Co., LTD, Suwon-si (KR)

( * ) Notice: Subject to any disclaimer, the term of this patent is extended or adjusted under 35 U.S.C. 154(b) by 608 days.

(21) Appl. No.: 09/592,535

(22) Filed: Jun. 12, 2000

(30) Foreign Application Priority Data

Jun. 11, 1999 (KR) ........................................ 1999/21785

(51) Int. Cl.[7] ................................................. G06F 1/16
(52) U.S. Cl. ...................... 361/683; 361/680; 361/681
(58) Field of Search ................................ 361/679–683, 361/686, 724–727, 729; 40/152.1, 493; 248/913, 917–923, 183.4, 278, 371; 400/83, 88; 364/708.1; 439/164, 165

(56) References Cited

U.S. PATENT DOCUMENTS

| | | |
|---|---|---|
| 4,395,010 A | 7/1983 | Helgeland et al. |
| 4,453,687 A | 6/1984 | Sweere |
| 4,494,720 A | 1/1985 | Gregory |
| 4,542,872 A | 9/1985 | Marino et al. |
| 4,555,081 A | 11/1985 | Ermanski |
| 4,570,892 A | 2/1986 | Czech |
| 4,621,782 A | 11/1986 | Carlson et al. |
| 4,858,864 A | 8/1989 | Thompson |
| 4,919,387 A | 4/1990 | Sampson |
| 5,016,849 A * | 5/1991 | Wu ............................. 248/183 |
| 5,034,858 A | 7/1991 | Kawamoto et al. |
| 5,168,423 A | 12/1992 | Ohgami et al. |
| 5,206,790 A | 4/1993 | Thomas et al. |
| 5,268,816 A * | 12/1993 | Abell, Jr. et al. ........... 361/729 |
| 5,276,589 A | 1/1994 | Bartlett et al. |
| 5,335,142 A | 8/1994 | Anderson |
| 5,345,362 A | 9/1994 | Winkler |
| 5,390,075 A | 2/1995 | English et al. |
| 5,548,478 A * | 8/1996 | Kumar et al. ............... 361/681 |
| 5,708,561 A | 1/1998 | Huilgol et al. |
| 5,751,544 A | 5/1998 | Song |
| 6,125,029 A | 9/2000 | Sasaki et al. |

* cited by examiner

*Primary Examiner*—Yean H Chang
(74) *Attorney, Agent, or Firm*—Robert E. Bushnell, Esq.

(57) ABSTRACT

A portable computer having cover support means is disclosed. The portable computer comprises a main body, a cover, a hinge mechanism, and cover support means. The cover has a display screen on its inside surface. The hinge mechanism connects the cover to the main body so as to allow the cover to be tilted relative to the main body around a horizontal tilting axis and to be swiveled around a vertical swiveling axis, the horizontal tilting axis being free from intersecting the horizontal swiveling axis. The cover support means supports the outside surface of the cover free from the display screen and prevents vibration of the cover, when the cover is swiveled at an angle of 180 degrees and tilted completely toward the main body so that the display screen faces upward.

47 Claims, 8 Drawing Sheets

PORTABLE COMPUTER HAVING COVER SUPPORT MEANS

CLAIM OF PRIORITY

This application makes reference to, incorporates the same herein, and claims all benefits accruing under 35 U.S.C. §119 from an application for PORTABLE COMPUTER WITH MECHANISM SUPPORTING COVER earlier filed in the Korean Industrial Property Office on the 11th of Jun. 1999 and there duly assigned Serial No. 21785/1999.

BACKGROUND OF THE INVENTION

1. Technical Field

The present invention relates, in general, to portable computers and, more particularly, to a portable computer having means for supporting its cover when the cover is swiveled at an angle of 180 degrees and tilted completely toward its main body so that its display screen faces upward.

2. Related Art

The use of portable computers has been increasing rapidly, including laptop computers, notebook computers, palm-sized computers, and desktop replacement computers. Such portable computers are practical in that they are light. A portable computer is provided with a cover that is hinged with its main body. The cover serves to prevent a keyboard from being damaged and to hold a display screen. For some portable computers, a liquid crystal display (LCD) is employed as the display screen. Such a liquid crystal display is suitable for portable computers by reason of its low power consumption and, in particular, has very low power consumption in comparison with a cathode ray tube (CRT) display that is employed for general desktop computers. Additionally, the liquid crystal display generally shows a high degree of resolution under high illumination.

I have found that a display of a portable computer can be only moved in a restricted number of positions, and is not properly supported in each of those positions. Efforts have been made to improve positioning of displays for portable computers.

Exemplars of recent efforts in the art include U.S. Ser. No. 09/419,775 for Portable Computer Display Tilt/Swivel Mechanism and Method filed on 18 Oct. 1999, U.S. Pat. No. 5,016,849 for Swivel Mechanism for a Monitor of a Laptop Computer issued to Wu, U.S. Pat. No. 5,168,423 for Portable Electronic Apparatus Having a Display Unit Rotating in Vertical and Horizontal Directions issued to Ohgami et al., U.S. Pat. No. 5,206,790 for Pivot and Swivel Mechanism for Lap Top Display issued to Thomas et al., U.S. Pat. No. 5,708,561 for Portable Computer Having Display Slidably and Rotatably Mounted for Movement Between Landscape and Portrait Orientation and to Open and Close Speaker Ports issued to Huilgol et al., U.S. Pat. No. 5,335,142 for Portable Computer Display Tilt/Swivel Mechanism issued to Anderson, U.S. Pat. No. 5,345,362 for Portable Computer Apparatus with Articulating Display Panel issued to Winkler, U.S. Pat. No. 5,276,589 for Notebook Computer Having Flip Screen Which Pivots and Slides within a Frame issued to Bartlett et al., U.S. Pat. No. 4,395,010 for Device for the Setting Up of a Data Display Device on a Work Surface issued to Helgeland et al., U.S. Pat. No. 4,453,687 for Swivel/Tilt Mounting Device for a Cathode Ray Tube issued to Sweere, U.S. Pat. No. 4,494,720 for tilt swivel Base issued to Gregory et al., U.S. Pat. No. 4,542,872 for Termintal with Tilt-Swivel Display issued to Marino et al., U.S. Pat. No. 4,555,081 for Tiltable and Swivable Mounting Assembly for a Video Display Terminal issued to Ermanski, U.S. Pat. No. 4,570,892 for Tiltable Rotating Display Monitor Mount issued to Czech et al., U.S. Pat. No. 4,621,782 for Arrangement for Mounting Apparatus issued to Carlson et al., U.S. Pat. No. 4,858,864 for Tilt and Swivel Mechanism issued to Thompson, U.S. Pat. No. 4,919,387 for Tilt and Swivel Support Apparatus issued to Sampson, and U.S. Pat. No. 5,034,858 for Electronic Information Equipment issued to Kawamoto et al.

While these recent efforts provide advantages, I note that they fail to adequately provide a portable computer having a cover support mechanism.

SUMMARY OF THE INVENTION

Accordingly, the present invention has been made keeping in mind the above problems occurring in the related art, and an object of the present invention is to provide a portable computer having a cover support mechanism, capable of preventing its cover from being vibrated, thereby allowing information input to be easily performed.

A further object of the present invention is to provide a portable computer having a cover support mechanism, capable of protecting its hinge mechanism and cables from being damaged.

In order to accomplish the above objects and others, the present invention provides a portable computer, comprising a main body, a cover having a display screen on its inside surface, a hinge mechanism connecting the cover to the main body so as to allow the cover to be tilted relative to the main body around a horizontal tilting axis and to be swiveled around a vertical swiveling axis, the horizontal tilting axis being free from intersecting the horizontal swiveling axis, and cover support means for supporting the outside surface of the cover free from the display screen and preventing vibration of the cover, when the cover is swiveled at an angle of 180 degrees and tilted completely toward the main body so that the display screen faces upward.

According to another embodiment, the cover support means may consist of two support brackets respectively fixed to both end portions of a rear surface of the main body and two cap assemblies respectively engaged with the support brackets, each of the cap assemblies comprising a cap, a cradle and a return spring, the cradle being projected forward out of the cap while being normally biased forward by the return spring.

According to a further embodiment, a projected support portion may be formed on the outside surface of the cover so as to fill the space between the cover and the main body when the cover is swiveled at an angle of 180 degrees and tilted completely toward the main body so that the display screen faces upward.

To achieve these and other objects in accordance with the principles of the present invention, as embodied and broadly described, the present invention provides a portable computer apparatus, comprising: a base; a cover having a front surface and a back surface, said front surface including a display screen conveying varying visual information to a user; a hinge assembly coupling said cover to said base, forming a first axis of rotation oriented parallel to said base, and forming a second axis of rotation oriented parallel to said cover, said cover tilting toward and away from said base around the first axis, said cover swiveling around the second axis, the first axis not intersecting with the second axis; and a support unit supporting said back surface of said cover when said cover is swiveled and tilted to a position having said back surface facing toward said base and having said display screen facing away from said base.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

Figure 1:
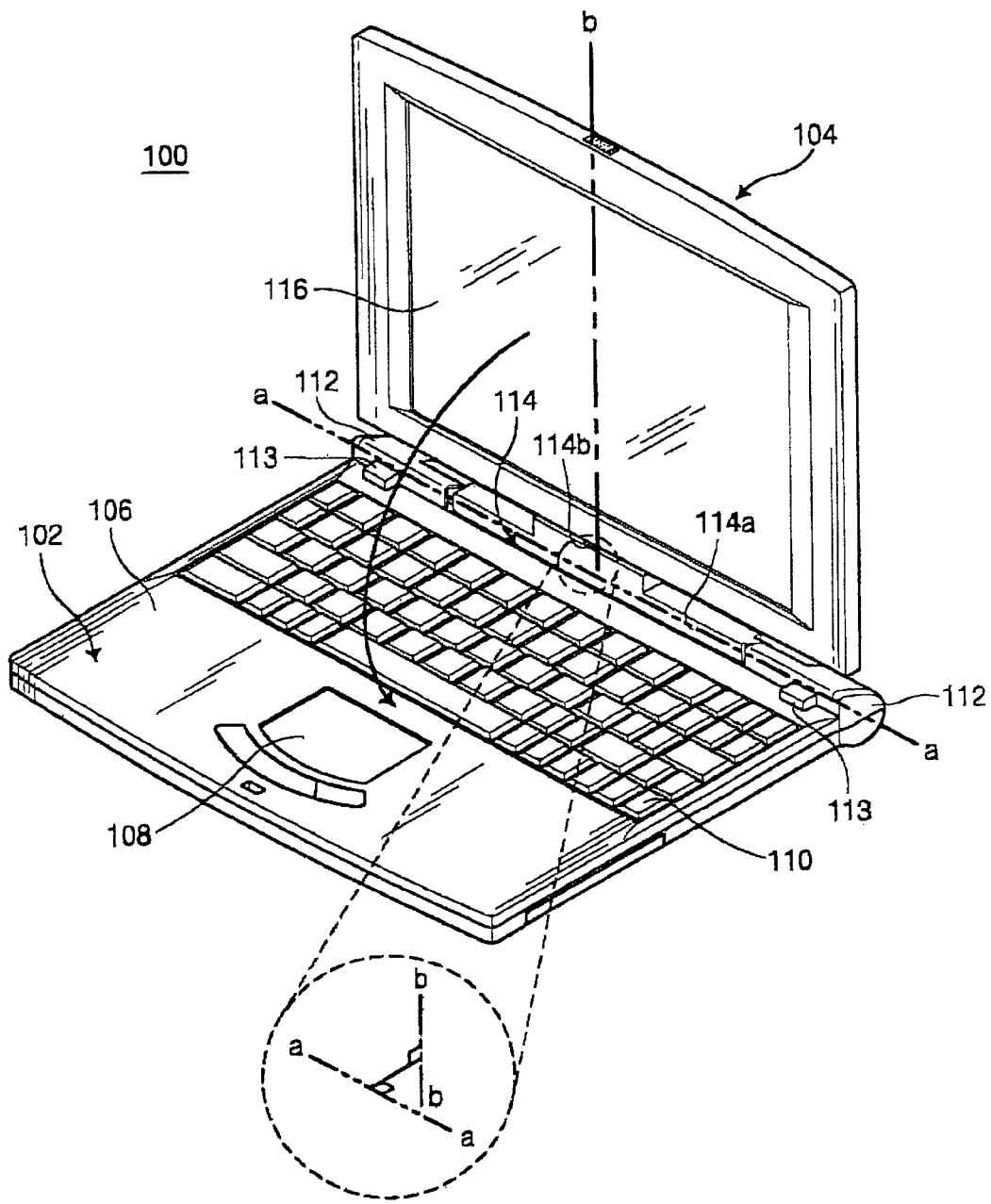
FIG. 1 is a perspective view showing a portable computer having cover support means, according to one embodiment of the present invention, in accordance with the principles of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

In a general portable computer, the liquid crystal display has a limitation in size under a trend in which the size of the portable computer is minimized, and the liquid crystal display is fixedly oriented toward a user. Consequently, when there is a necessity to show the information on the liquid crystal display to multiple persons, the portable computer should be moved or rotated toward the persons so as to prevent the inconvenience of having to approach the liquid crystal display. However, when the portable computer is moved or rotated, the sensitive parts of the computer, such as a hard disk, may be damaged by external impact that may be caused by the movement or rotation of the portable computer. In order to overcome this problem, there is proposed a new type of portable computer wherein its cover is capable of being swiveled within a certain angle. A tilt/swivel mechanism for a portable computer display is disclosed in U.S. Ser. No. 09/419,775 filed on 18 Oct. 1999, and is here incorporated by reference. The aforementioned U.S. Ser. No. 09/419,775 includes subject matter set forth in Korea Patent Application No. 98-43763 filed by Samsung Electronic Co. Ltd. on 16 Oct. 1998, and discloses a portable computer wherein its cover is capable of being swiveled at an angle of 180 degrees and being tilted, by means of a hinge mechanism. Consequently, when the erected cover of the computer is swiveled at an angle of 180 degrees and tilted completely toward its main body, the display screen is oriented upwards. In this case, information on the display screen can be shared by multiple persons, and input to the computer using a stylus can be easily performed when a touch screen panel is employed as the display screen.

However, if the portable computer has a hinge mechanism whose horizontal tilting axis does not intersect its vertical swiveling axis and, simultaneously, its cover is swiveled at an angle of 180 degrees and tilted completely toward the main body, the swiveled cover comes into contact with the main body at their front edges and the swiveled cover is spaced apart from the main body at their rear edges. Under this condition, when information is inputted to the portable computer via a touch screen panel using a stylus, vibration of the cover is created, thereby causing information input using a stylus to be difficult, and rendering its hinge mechanism and cables to be damaged.

FIG. 1 is a perspective view showing a portable computer having cover support means, according to an embodiment of the present invention, in accordance with the principles of the present invention. Referring to FIG. 1, the portable computer 100 of the present invention includes a main body 102, a cover 104, a hinge mechanism 114, and cover support means. The main body 102 consists of a housing 106, a pointing device 108, a keyboard assembly 110, and multiple electronic devices and printed circuit boards (contained in the housing 106 and not shown). Also shown in FIG. 1, a cradle 113, a cap assembly 112, and a display screen 116.

The hinge mechanism 114 is positioned on the center portion of the rear surface of the main body 102. Referring to FIG. 1, there is illustrated in an opened state the cover 104, which has a display screen 116 on its inner surface and is connected to the main body 102 by means of the hinge mechanism 114. The hinge mechanism 114 is capable of tilting the cover 104 around a horizontal axis and is capable of swiveling the cover 104 around a vertical axis. Since the construction and operation of the hinge mechanism 114 is disclosed in detail in the aforementioned U.S. Ser. No. 09/419,775 and Korea Patent Application No. 98-43763, the hinge mechanism 114 is described briefly in this specification. That is, the hinge mechanism 114 allows the cover 104 to be tilted in a direction of the arrow of FIG. 1 around a horizontal tilting axis of line a—a of FIG. 1 by means of a tilting member 114a, while the hinge mechanism 114 allows the cover 104 to be swivelled around a vertical swiveling axis of line b—b of FIG. 1 by means of a swiveling member 114b. In particular, in this embodiment, the cover 104 is capable of being tilted from a closed position of 0 degrees to a fully opened position of about 135 degrees and being swivelled within an angle range of about 180 degrees. In this case, the vertical swiveling axis of the hinge mechanism 114 as shown by the line b—b of FIG. 1 does not intersect the horizontal tilting axis of the hinge mechanism 114 as shown by the line a—a of FIG. 1. That is, the vertical swiveling axis does not meet the horizontal tilting axis at a point, but is spaced apart from the horizontal tilting axis by a certain distance. This embodiment is an example wherein the horizontal tilting axis of the hinge mechanism 114 is somewhat ahead of the vertical swiveling axis. The vertical swiveling axis allows the cover 104 to swivel in clockwise and counterclockwise directions with respect to the main body 102.

Figure 2A:
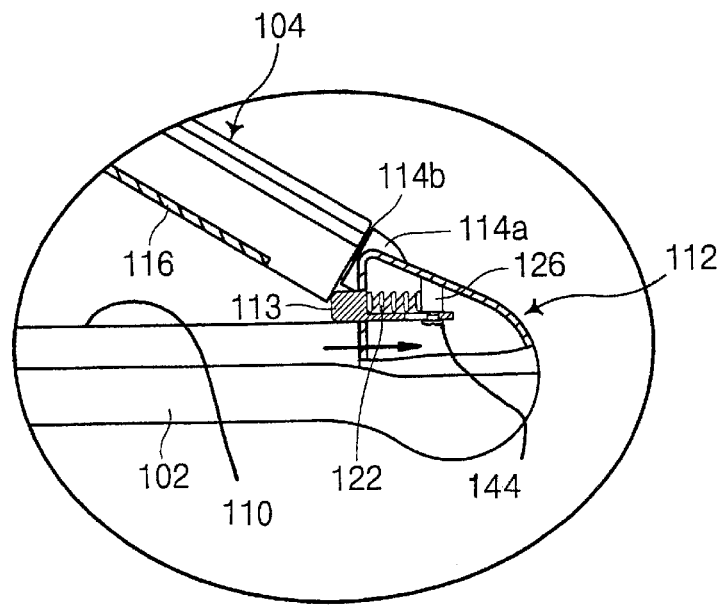
FIGS. 2A and 2B are partial sectional views for explaining the closing of the cover while the cover is not swiveled, in accordance with the principles of the present invention.
Figure 2B:
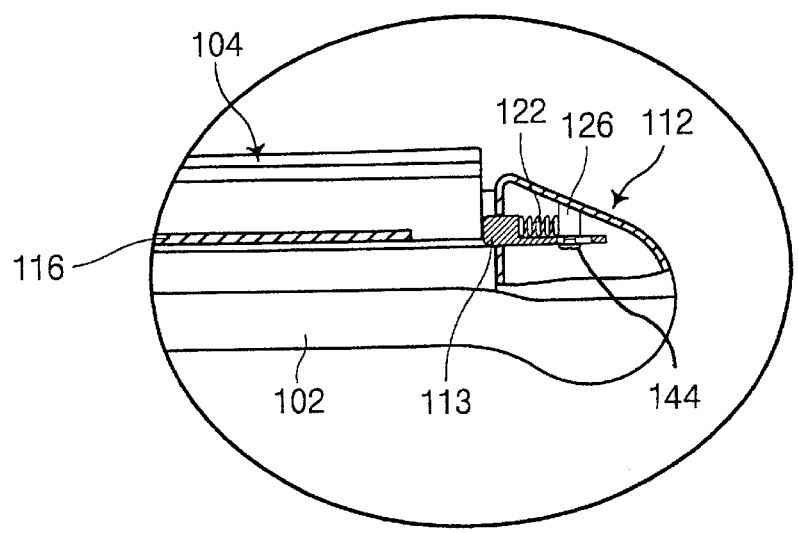

FIGS. 2A and 2B are partial sectional views for explaining the closing of the cover while the cover is not swiveled, in accordance with the principles of the present invention. FIGS. 2A and 2B show a cover 104, a display screen 116, a cradle 113, a swiveling member 114b, a tilting member 114a, a second boss 126 receiving a screw 144, a cap assembly 112, a return spring 122, and a main body 102. The spring 122 provides an elastic force pushing the cradle 113 out from said cap 121.

Figure 3:
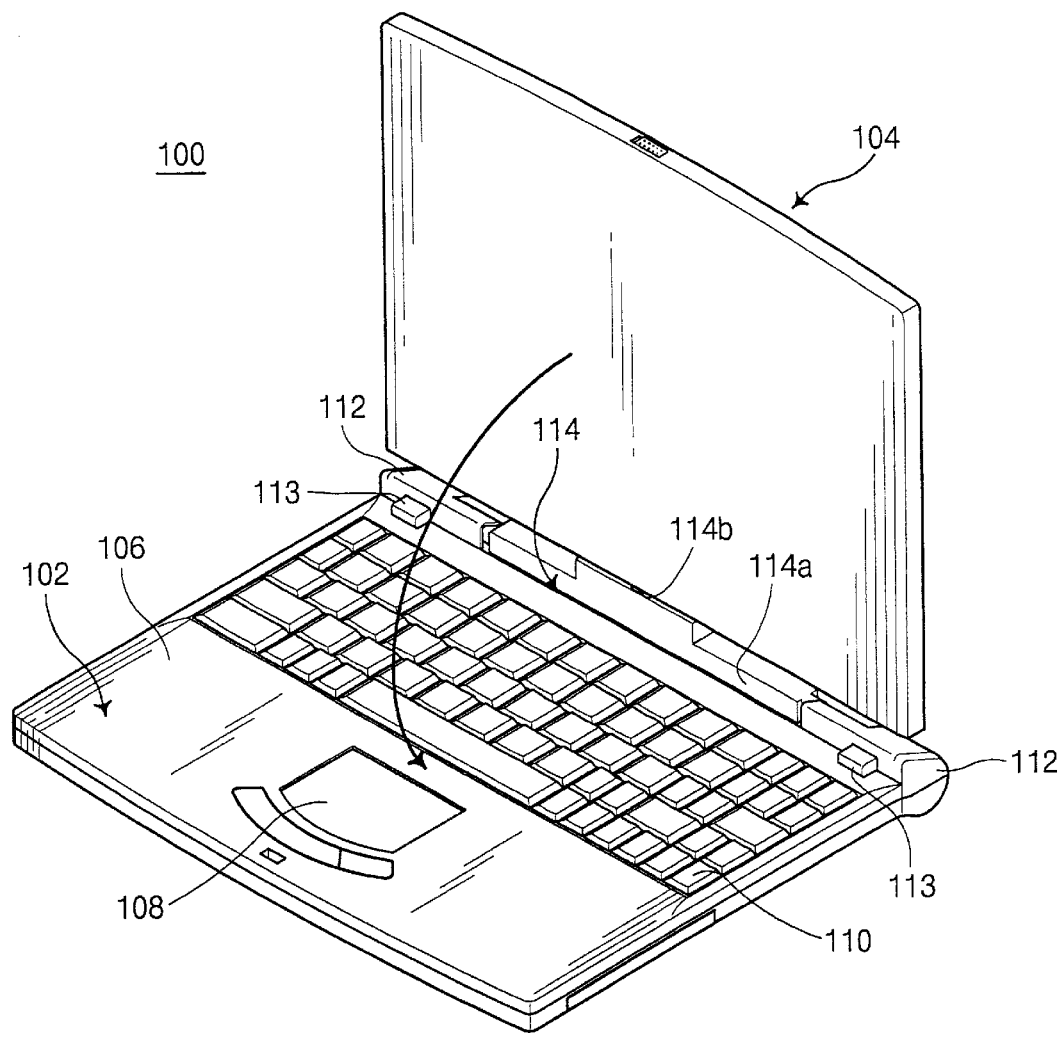
FIG. 3 is a perspective view showing the portable computer of the present invention with the cover swiveled at an angle of 180 degrees, in accordance with the principles of the present invention.
Figure 4:
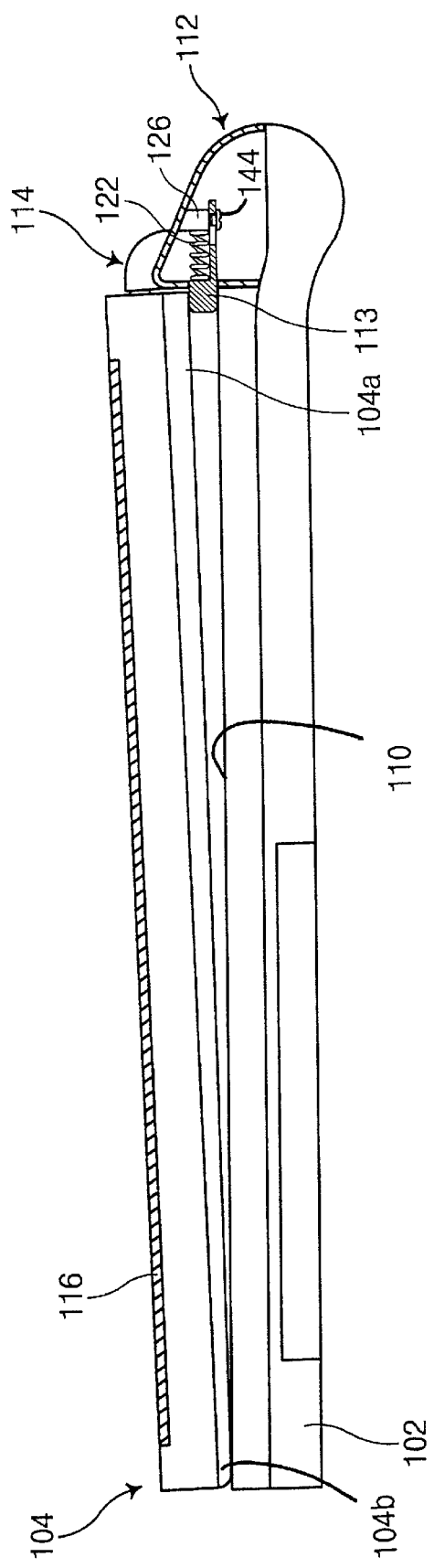
FIG. 4 is a side partial sectional view showing the portable computer in which its cover is supported by the cover support means while being swiveled to 180 degrees and is closed on its main body, in accordance with the principles of the present invention.

FIG. 3 is a perspective view showing the portable computer of the present invention with the cover swiveled at an angle of 180 degrees, in accordance with the principles of the present invention. FIG. 4 is a side partial sectional view showing the portable computer in which its cover is supported by the cover support means while being swiveled to 180 degrees and is closed on its main body, in accordance with the principles of the present invention.

FIG. 4 shows that a back 104a of the cover 104. The cover 104 has a front inside surface holding a display screen 116 and the cover has a back outside surface 104a. As shown in FIG. 4, the back 104a is facing the keyboard assembly 110 of the main body 102, and the back 104a is in contact with the cradle 113.

Figure 5:
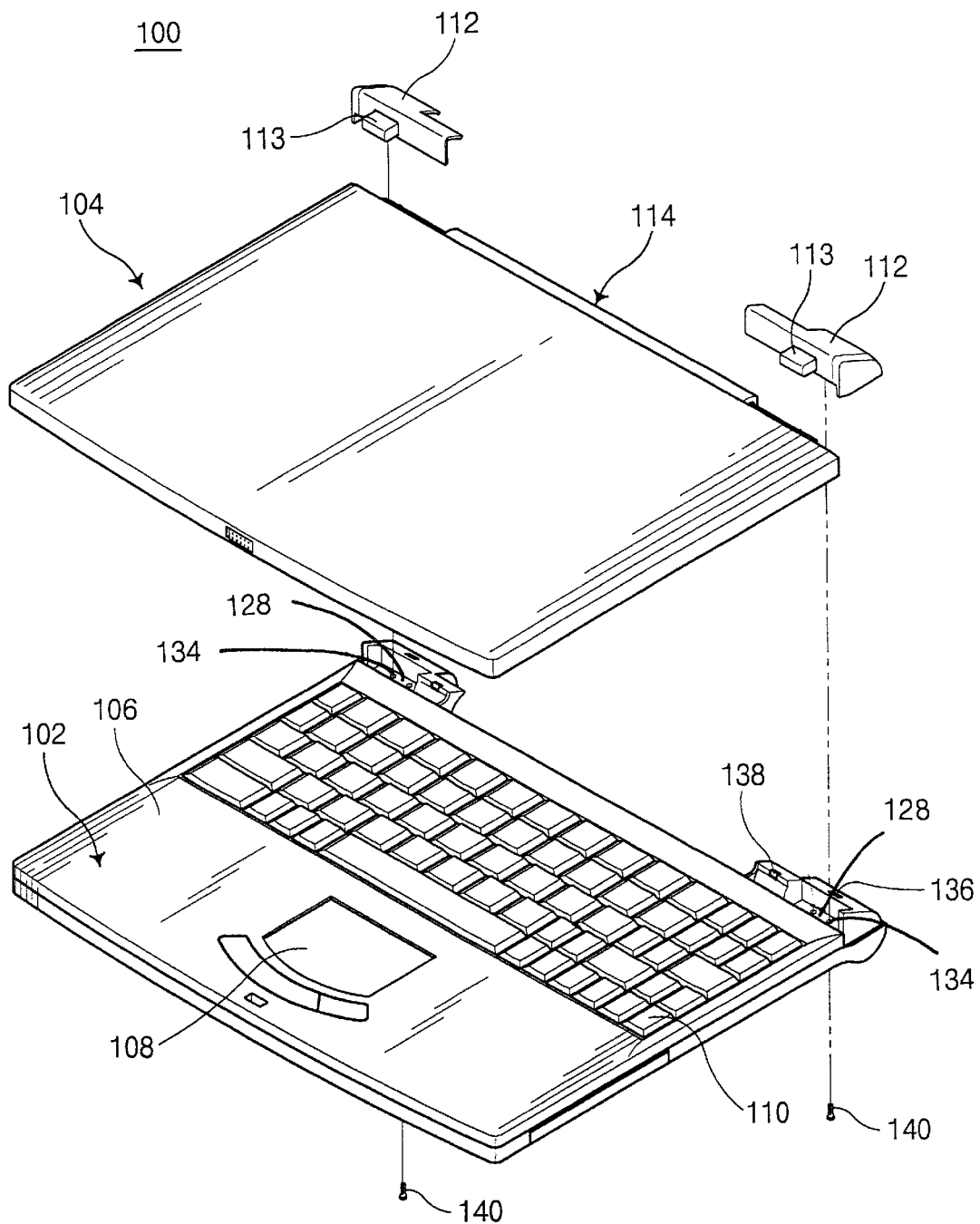
FIG. 5 is an exploded perspective view of FIG. 1, in accordance with the principles of the present invention.
Figure 6A:
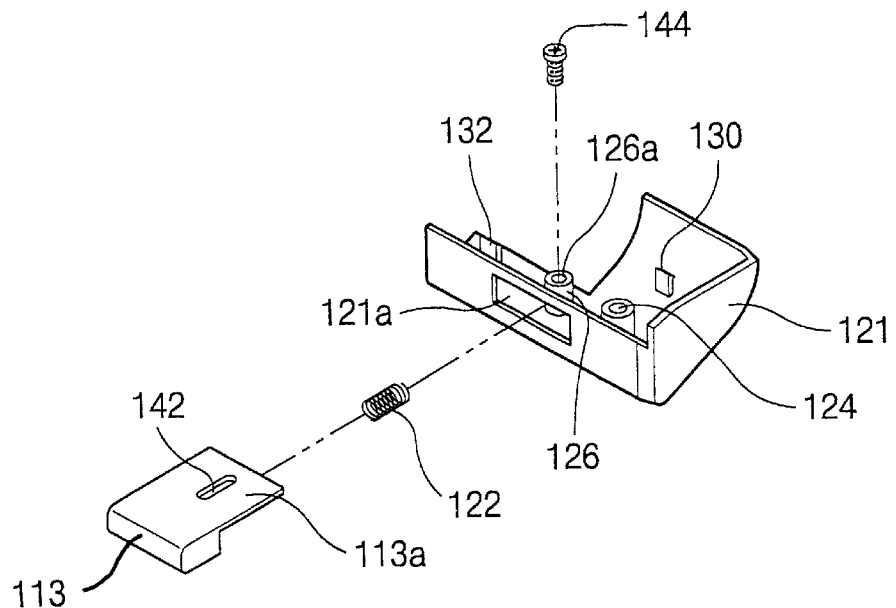
FIGS. 6A and 6B are perspective views showing a cap assembly of the cover support means, in accordance with the principles of the present invention.
Figure 6B:
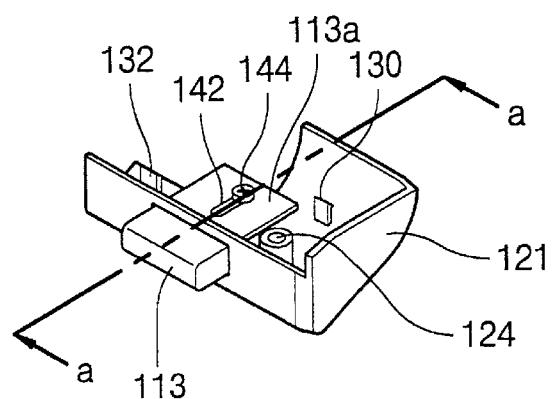
Figure 7:
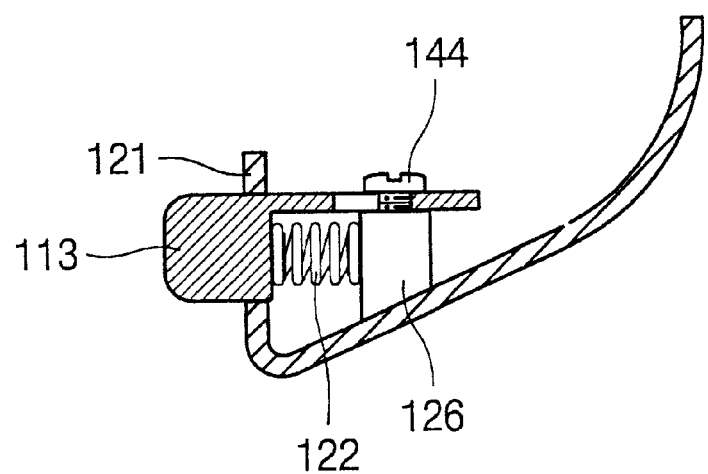
FIG. 7 is a sectional view taken along line a—a of FIG. 6B, in accordance with the principles of the present invention.

FIG. 5 is an exploded perspective view of FIG. 1. FIGS. 6A and 6B are perspective views showing the cap assembly of the cover support means. FIG. 7 is a sectional view taken along line a—a of FIG. 6B. In order to prevent vibration of the completely swiveled cover 104 that is easily created in a portable computer having such a hinge mechanism 114, cover support means is provided. The cover support means consists of two support brackets 128 and two cap assemblies 112. The support brackets 128 are provided on both end portions of the rear surface of the main body 102. The cap assemblies 112 are respectively fixed to the support brackets 128.

Each of the cap assemblies 112 comprises the cap 121, the cradle 113, a return spring 122, and a fixation screw 144. The cap 121 is provided with an insertion hole 121a, a first boss 124, a second boss 126 having a fixation hole 126a, a first locking projection 130, and a second locking projection 132.

The first boss 124 is fixed to the support bracket 128, which is also fixed to the main body 102, by means of a fixation screw 140 while being inserted into a boss hole 134 of the support bracket 128. The first and second locking projections 130 and 132 are respectively engaged with fixation holes 136 and 138 while being inserted into the fixation holes 136 and 138. The second boss 126 is used to connect the cradle 113 to the cap 121, as best shown in FIGS. 6A and 6B and described in the following.

The cradle 113 has an extended portion 113a and a slot 142 that is formed on the extended portion 113a. The cradle 113 is slidably connected to the cap 121, in such a way that the cradle 113 is inserted into the interior of the cap 121 through the insertion hole 121a of the cap 121, the slot 142 of the cradle 113 is positioned on the fixation hole 126a of the second boss 126 of the cap 121, and the fixation screw 144 is secured in the fixation hole 126a of the second boss 126 of the cap 121 while passing through the slot 142 of the cradle 113. Of course, in this case, the fixation screw 144 is not completely inserted into the fixation hole 126a of the second boss 126 so as to allow the cradle 113 to be moved.

The return spring 122 is fixed to the inner surface of the body of the cradle 113 at its one end and to the outer circumferential surface of the second boss 126 at its other end. As a result, the cradle 113 is capable of being moved linearly by a distance corresponding to the length of the slot 142, and being restored to its normal position by means of the return spring 122 when the cradle 113 is pushed rearward by the cover 104.

FIGS. 2A and 2B are partial sectional views for explaining the closing of the cover while the cover is not swiveled. FIG. 3 is a perspective view showing the portable computer of the present invention with the cover swiveled at an angle of 180 degrees. As shown in FIGS. 2A and 2B, while the cover 104 is closed without being swiveled, the rear surface of the cover 104 pushes rearward the cradles 113 that are projected from the cap 121. As best seen in FIGS. 2A and 2B, the cradles 113 are respectively connected to the cap 121 so as to be moved linearly. In such a normal case, since the cover 104 can come into contact with the main body 102 surface to surface without being inclined, the cover 104 pushes the cradles 113 rearward, when the display 116 faces the keyboard assembly 110.

On the other hand, when the cover 104 is tilted to be closed after it is swiveled as shown in FIG. 3, it is in a state where the display screen 116 faces upward, thereby allowing the display screen 116 to be seen by multiple persons and allowing information to be easily inputted into the display screen 116 by means of a stylus. In this portable computer, its horizontal tilting axis is somewhat ahead of its vertical swiveling axis and, consequently, the vertical swiveling axis passes through the cover 104 at a position spaced rearward from a longitudinal centerline of a hinged surface of the cover. Therefore, when the cover 104 is swiveled at an angle of 180 degrees and tilted completely toward the main body 102, the swiveled cover 104 comes into contact with the main body 102 at their front edges and the cover 104 is spaced apart from the main body 102 at their rear edges, thereby forming a space between the swiveled cover 104 and the main body 102. In accordance with the present invention, the cradles 113 of the cap assemblies 112 are positioned in the space between the swiveled cover 104 and the main body 102 and support the swiveled cover 104, thereby preventing the swiveled cover 104 from being vibrated.

Figure 8:
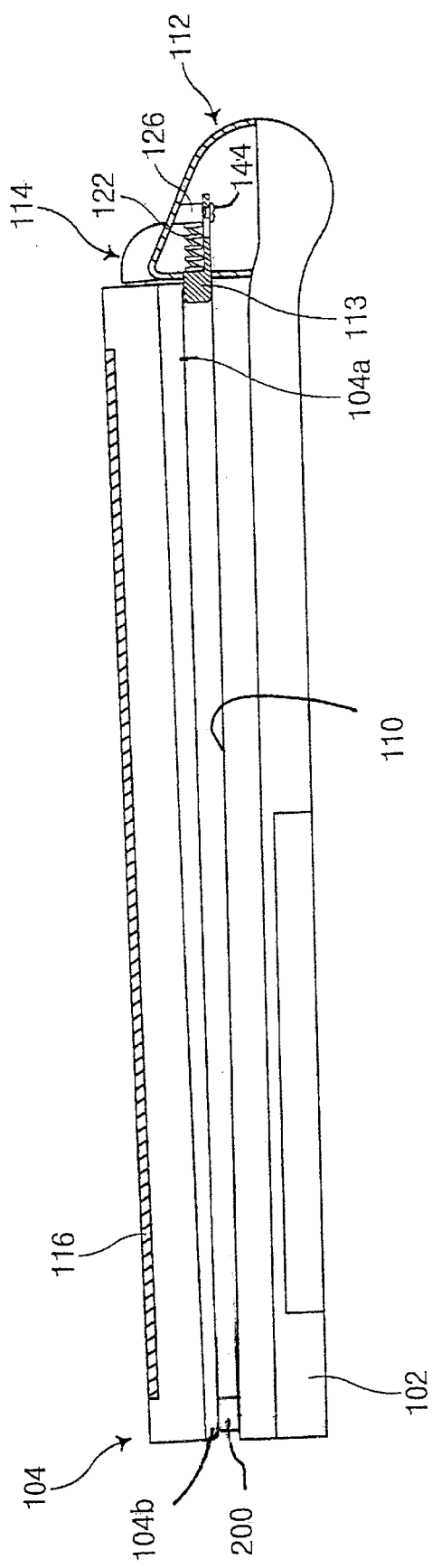
FIG. 8 is a side partial sectional view showing the portable computer in which its cover is supported by the cover support means and a projected support portion while being swiveled to 180 degrees and is closed on its main body, in accordance with the principles of the present invention.

FIG. 8 shows another embodiment of the present invention. FIG. 8 is a side partial sectional view showing the portable computer in which its cover is supported by the cover support means and a projected support portion while being swiveled to 180 degrees and is closed on its main body, in accordance with the principles of the present invention. A projected support portion 200 may be formed on the outside surface of the cover 104 so as to fill the space between the cover 104 and the main body 102 when the cover 104 is swiveled at an angle of 180 degrees and tilted completely toward the main body 102 so that the display screen 116 faces upward. The back 104a of the cover 104 has a top region 104b, as shown in FIG. 4. The projected support portion 200 can be formed on the back 104a at or near the top region 104b, in order to separate the cover 104 from the main body 102, which could enhance stability and prevent the back 104a from contacting the main body 102 and the keyboard assembly 110. Of course, the projected support portion 200 may be designed in various constructions as occasion demands. The projected support portion 200 can be referred to as a projection 200. A reinforcement plate (not shown) may be contained in the projected support portion so as to reinforce the hinge mechanism 104.

The main body 102 can be referred to as a base 102. The hinge mechanism 114 can be referred to as a hinge assembly 114. When the portable computer 100 is in a closed position as shown in FIG. 2B, with the display screen 116 facing the keyboard assembly 110, the cover 104 can be said to be tilted at an angle of zero degrees, or not tilted at all. When the portable computer 100 is in the open position as shown in FIG. 1, the cover 104 is tilted at an angle of approximately 90 degrees. When the cover 104 is tilted further back from the 90 degree position, causing the cover 104 to be substantially parallel to the base 102, then the cover 104 is tilted at an angle of 180 degrees.

As shown in FIG. 1, when the cover 104 is tilted on the horizontal axis to an angle of 90 degrees and the cover 104 is not swiveled on the vertical axis, then the display screen is substantially vertical and the base 102 is substantially horizontal and the display screen 116 is facing toward the pointing device 108. On the contrary, as shown in FIG. 3, when the cover 104 is tilted on the horizontal axis to an angle of 90 degrees and the cover 104 is swiveled on the vertical axis at an angle of approximately 180 degrees, then the display screen is substantially vertical and the base 102 is substantially horizontal and the display screen 116 is facing away from the pointing device 108.

The aforementioned horizontal axis is parallel to the line a—a shown in FIG. 1. The aforementioned vertical axis is parallel to the line b—b shown in FIG. 1. The horizontal axis and the vertical axis do not intersect with each other. In other words, the horizontal axis and the vertical axis are offset from each other. The horizontal axis is parallel to the base 102, and the vertical axis is parallel to the cover 104.

As described above, the present invention provides a portable computer, which is capable of prevention its cover from being vibrated while the cover is swiveled at an angle of 180 degrees thereby allowing information input to be easily performed and protecting its hinge mechanism and cables from being damaged.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A portable computer apparatus, comprising:
    a base;
    a cover having a front surface and a back surface, said front surface including a display screen conveying varying visual information to a user;
    a hinge assembly coupling said cover to said base, forming a first axis of rotation oriented parallel to said base, and forming a second axis of rotation oriented parallel to said cover and substantially perpendicular to the first axis, said cover tilting toward and away from said base around the first axis, said cover swiveling around the second axis in clockwise and counterclockwise directions with respect to said base, the first axis not intersecting with the second axis; and
    a support unit supporting said back surface of said cover when said cover is swivelled and tilted to a position having said back surface facing toward said base and having said display screen facing away from said base.

2. The apparatus of claim 1, said hinge assembly coupling a rear edge of said base to a bottom edge of said cover, said rear edge of said base corresponding to an edge opposite to a front edge of said base, said front edge of said base being adjacent to a top edge of said cover when said portable computer apparatus is in a closed position.

3. The apparatus of claim 2, said support unit comprising:
    a support bracket being fixed to said rear edge of said base;
    a cap assembly engaging said support bracket, said cap assembly comprising:
        a cap;
        a cradle; and
        a spring, said cradle extending out from said cap toward said front edge of said base away from said rear edge of said base by an elastic force of said spring.

4. The apparatus of claim 3, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover.

5. The apparatus of claim 3, said cradle projecting out from said cap and supporting said back surface of said cover when said cover is swiveled and tilted to the position having said back surface facing toward said base and having said display screen facing away from said base.

6. The apparatus of claim 5, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover.

7. The apparatus of claim 3, said cradle not projecting out from said cap when said portable computer apparatus is in the closed position.

8. The apparatus of claim 3, said cover and said base being in close proximity when in the closed position.

9. The apparatus of claim 3, said cover and said base not being separated by said cradle when in the closed position.

10. The apparatus of claim 2, said support unit comprising:
    a first and a second support bracket being fixed to said rear edge of said base at opposite ends of said rear edge of said base;
    a first and second cap assembly respectively engaging said first and second support brackets, each one of said first and second cap assemblies comprising:
        a cap;
        a cradle; and
        a spring, said cradle extending out from said cap toward said front edge of said base away from said rear edge of said base by an elastic force of said spring.

11. The apparatus of claim 1, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover.

12. The apparatus of claim 1, said cover being substantially parallel to said base and said front surface facing toward said base and said back surface facing away from said base, when said portable computer apparatus is in a closed position.

13. The apparatus of claim 12, said cover being substantially perpendicular to said base, when said portable computer apparatus is in a first open position.

14. The apparatus of claim 13, said cover being substantially parallel to said base and said front surface facing away from said base and said back surface facing toward said base, when said portable computer apparatus is in a second open position.

15. The apparatus of claim 1, said cover being substantially perpendicular to said base, when said portable computer apparatus is in an open position.

16. The apparatus of claim 1, said cover being substantially parallel to said base, said front surface facing away from said base and toward the user, and said back surface facing toward said base, when said portable computer apparatus is in an open position.

17. The apparatus of claim 1, further comprising said base having a keyboard, the user utilizing said keyboard to input data to said apparatus.

18. A portable computer apparatus, comprising:
   a base;
   a cover having a front surface and a back surface, said front surface including a display screen conveying varying visual information to a user;
   a hinge assembly coupling said cover to said base, forming a first axis of rotation oriented parallel to said base, and forming a second axis of rotation oriented parallel to said cover, said cover tilting toward and away from said base around the first axis, said cover swiveling around the second axis, the first axis not intersecting with the second axis; and
   a support unit supporting said back surface of said cover when said cover is swivelled and tilted to a position having said back surface facing toward said base and having said display screen facing away from said base;
   said hinge assembly coupling a rear edge of said base to a bottom edge of said cover, said rear edge of said base corresponding to an edge opposite to a front edge of said base, said front edge of said base being adjacent to a top edge of said cover when said portable computer apparatus is in a closed position;
   said support unit comprising:
      a support bracket being fixed to said rear edge of said base;
      a cap assembly engaging said support bracket, said cap assembly comprising:
         a cap;
         a cradle; and
         a spring, said cradle extending out from said cap toward said front edge of
      said base away from said rear edge of said base by an elastic force of said spring; said bottom edge of said cover pushing said cradle into said cap and compressing said spring when in the closed position.

19. A portable computer apparatus, comprising:
   a base;
   a cover having a front surface and a back surface, said front surface including a display screen conveying varying visual information to a user;
   a hinge assembly coupling said cover to said base, forming a first axis of rotation oriented parallel to said base, and forming a second axis of rotation oriented parallel to said cover and substantially perpendicular to the first axis, said cover tilting toward and away from said base around the first axis, said cover swiveling around the second axis, the second axis passing through the cover at a position spaced rearward from the first axis; and
   a support unit supporting said back surface of said cover when said cover is swivelled and tilted to a position having said back surface facing toward said base and having said display screen facing away from said base.

20. The apparatus of claim 19, said hinge assembly coupling a rear edge of said base to a bottom edge of said cover, said rear edge of said base corresponding to an edge opposite to a front edge of said base, said front edge of said base being adjacent to a top edge of said cover when said portable computer apparatus is in a closed position.

21. The apparatus of claim 20, said support unit comprising:
   a support bracket being fixed to said rear edge of said base;
   a cap assembly engaging said support bracket, said cap assembly comprising:
      a cap;
      a cradle; and
      a spring, said cradle extending out from said cap toward said front edge of said base away from said rear edge of said base by an elastic force of said spring.

22. The apparatus of claim 21, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover.

23. The apparatus of claim 21, said cradle projecting out from said cap and supporting said back surface of said cover when said cover is swiveled and tilted to the position having said back surface facing toward said base and having said display screen facing away from said base.

24. The apparatus of claim 23, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover.

25. The apparatus of claim 21, said cradle not projecting out from said cap when said portable computer apparatus is in the closed position.

26. The apparatus of claim 21, said cover and said base being in close proximity when in the closed position.

27. The apparatus of claim 21, said cover and said base not being separated by said cradle when in the closed position.

28. The apparatus of claim 20, said support unit comprising:
   a first and a second support bracket being fixed to said rear edge of said base at opposite ends of said rear edge of said base;

a first and second cap assembly respectively engaging said first and second support brackets, each one of said first and second cap assemblies comprising:
a cap;
a cradle; and
a spring, said cradle extending out from said cap toward said front edge of said base away from said rear edge of said base by an elastic force of said spring.

29. The apparatus of claim 19, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover.

30. The apparatus of claim 19, said cover being substantially parallel to said base and said front surface facing toward said base and said back surface facing away from said base, when said portable computer apparatus is in a closed position.

31. The apparatus of claim 30, said cover being substantially perpendicular to said base, when said portable computer apparatus is in a first open position.

32. The apparatus of claim 31, said cover being substantially parallel to said base and said front surface facing away from said base and said back surface facing toward said base, when said portable computer apparatus is in a second open position.

33. The apparatus of claim 19, said cover being substantially perpendicular to said base, when said portable computer apparatus is in an open position.

34. The apparatus of claim 19, said cover being substantially parallel to said base, said front surface facing away from said base and toward the user, and said back surface facing toward said base, when said portable computer apparatus is in an open position.

35. The apparatus of claim 19, further comprising said base having a keyboard, the user utilizing said keyboard to input data to said apparatus.

36. A portable computer apparatus, comprising:
a base;
a cover having a front surface and a back surface, said front surface including a display screen conveying varying visual information to a user;
a hinge assembly coupling said cover to said base, forming a first axis of rotation oriented parallel to said base, and forming a second axis of rotation oriented parallel to said cover, said cover tilting toward and away from said base around the first axis, said cover swiveling around the second axis, the second axis passing through the cover at a position spaced rearward from the first axis; and
a support unit supporting said back surface of said cover when said cover is swivelled and tilted to a position having said back surface facing toward said base and having said display screen facing away from said base;
said hinge assembly coupling a rear edge of said base to a bottom edge of said cover, said rear edge of said base corresponding to an edge opposite to a front edge of said base, said front edge of said base being adjacent to a top edge of said cover when said portable computer apparatus is in a closed position;
said support unit comprising:
a support bracket being fixed to said rear edge of said base;
a cap assembly engaging said support bracket, said cap assembly comprising:
a cap;
a cradle; and
a spring, said cradle extending out from said cap toward said front edge of
said base away from said rear edge of said base by an elastic force of said spring;
said bottom edge of said cover pushing said cradle into said cap and compressing said spring when in the closed position.

37. A portable computer apparatus, comprising:
a base;
a cover having a front surface and a back surface opposite to said front surface, said front surface including a display screen conveying varying visual information to a user;
a hinge assembly coupling said cover to said base, forming a first axis of rotation oriented parallel to said base at a rear edge of said base, and forming a second axis of rotation oriented parallel to said cover and substantially perpendicular to the first axis, said cover tilting toward and away from said base around the first axis, said cover swiveling around the second axis, the first axis not intersecting with the second axis; and
a support unit supporting said back surface of said cover when said cover is swivelled and tilted to a position having said back surface facing toward said base and having said display screen facing away from said base, said support unit comprising:
a support bracket being fixed to said base;
a cap assembly engaging said support bracket, said cap assembly comprising:
a cap;
a cradle; and
a spring, said cradle extending out from said cap toward said front edge of
said base away from said rear edge of said base by an elastic force of said spring.

38. The apparatus of claim 37, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover.

39. The apparatus of claim 37, said cradle projecting out from said cap and supporting said back surface of said cover when said cover is swiveled and tilted to the position having said back surface facing toward said base and having said display screen facing away from said base.

40. The apparatus of claim 39, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover.

41. The apparatus of claim 37, said hinge assembly coupling a rear edge of said base to a bottom edge of said cover, said rear edge of said base corresponding to an edge opposite to a front edge of said base, said front edge of said base being adjacent to a top edge of said cover when said portable computer apparatus is in a closed position, said cradle not projecting out from said cap when said portable computer apparatus is in the closed position.

42. The apparatus of claim 41, said base and said front surface of said cover being in close proximity when said apparatus is in the closed position.

43. The apparatus of claim 41, said cover and said base not being separated by said cradle when said apparatus is in the closed position.

44. The apparatus of claim 37, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover and reducing vibration of said cover.

45. The apparatus of claim 37, said support unit reducing vibration of said cover.

46. The apparatus of claim 46, further comprising a projection being formed on said back surface of said cover and filling a space between said back surface of said cover and said base, when said cover is swiveled and tilted to the position having said back surface facing toward said base and having said display screen facing away from said base, said projection further supporting said back surface of said cover and further reducing vibration of said cover.

47. A portable computer apparatus, comprising:
   a base;
   a cover having a front surface and a back surface opposite to said front surface, said front surface including a display screen conveying varying visual information to a user;
   a hinge assembly coupling said cover to said base, forming a first axis of rotation oriented parallel to said base at a rear edge of said base, and forming a second axis of rotation oriented parallel to said cover, said cover tilting toward and away from said base around the first axis, said cover swiveling around the second axis, the first axis not intersecting with the second axis; and
   a support unit supporting said back surface of said cover when said cover is swivelled and tilted to a position having said back surface facing toward said base and having said display screen facing away from said base, said support unit comprising:
      a support bracket being fixed to said base;
      a cap assembly engaging said support bracket, said cap assembly comprising:
         a cap;
         a cradle; and
         a spring, said cradle extending out from said cap toward said front edge of
      said base away from said rear edge of said base by an elastic force of said spring;
   said hinge assembly coupling a rear edge of said base to a bottom edge of said cover, said rear edge of said base corresponding to an edge opposite to a front edge of said base, said front edge of said base being adjacent to a top edge of said cover when said portable computer apparatus is in a closed position, said cradle not projecting out from said cap when said portable computer apparatus is in the closed position;
   said cover pushing said cradle toward said cap and compressing said spring when said apparatus is in the closed position.

* * * * *